United States Patent
Sagawa et al.

[15] 3,681,371
[45] Aug. 1, 1972

[54] PROCESS FOR PURIFICATION OF CRUDE 2-MERCAPTOBENZOTHIAZOLE

[72] Inventors: Seiji Sagawa; Haruo Kunihiro; Osamu Kimura; Masatoshi Inoue, all of Osaka, Japan

[73] Assignee: Sumitomo Chemical Co., Ltd., Osaka, Japan

[22] Filed: May 7, 1970

[21] Appl. No.: 35,546

[30] Foreign Application Priority Data

May 8, 1969 Japan..........................44/36050

[52] U.S. Cl................................................260/306
[51] Int. Cl. ..............................................C07d 91/48
[58] Field of Search..............................260/306, 706

[56] References Cited

UNITED STATES PATENTS 2,422,874   6/1947   Zenusa .........................260/706
2,916,494   12/1959   O'Brochta .....................260/706
3,531,492   9/1970   Merlin ..........................260/306

*Primary Examiner*—Alex Mazel
*Assistant Examiner*—R. J. Gallagher
*Attorney*—Sughrue, Rothwell, Mion, Zinn and Macpeak

[57] ABSTRACT

A process for purifying crude 2-mercaptobenzothiazole, obtained by the reaction of aniline, sulfur and carbon disulfide, which comprises vaporizing the crude 2-mercaptobenzothiazole to remove non-volatile impurities, and if desired, dissolving the condensate in an aqueous alkali solution to remove the insolubles, and/or subjecting the resulting alkali solution to extraction with an aromatic hydrocarbon, thereby to obtain pure 2-mercaptobenzothiazole. 2-Mercaptobenzothiazole is useful as an intermediate for the production of rubber vulcanization accelerators.

28 Claims, No Drawings

PROCESS FOR PURIFICATION OF CRUDE 2-MERCAPTOBENZOTHIAZOLE

BACKGROUND OF THE INVENTION

1. Field of the Invention

The present invention relates to a process for purifying crude 2-mercaptobenzothiazole to render it suitable for marketing and the preparation of derivatives, for example, disulfides and sulfenamides.

2. Description of the Prior Art

2-Mercaptobenzothiazole is a basic raw material compound in the thiazole series of rubber vulcanization accelerators and, according to the most conventional method, is prepared by treating a mixture of aniline, sulfur, and carbon disulfide at an appropriate ratio at an elevated temperature under a high pressure. With the activity of the rubber industry and the automobile industry the demand has increased. However, crude 2-mercaptobenzothiazole, obtained by reacting aniline, sulfur and carbon disulfide under a high pressure as described above, contains byproducts and intermediates such as anilinobenzothiazole, benzothiazole, phenylisothiocyanate, diphenylthiourea and 2-aminothiophenol and 3-(2-benzothiazolyl)-2-benzothiazolinethione at various mixing ratios as well as unreacted aniline and sulfur. Additionally, crude 2-mercaptobenzothiazole contains a resinous tar, unknown in composition and chemical structure. Removal of this is a most important problem.

Therefore, in order to use 2-mercaptobenzothiazole for marketing or as a raw material for preparation of related derivatives, a complete purification of the material is required. With respect to purification, many discussions have hitherto been held and reported or disclosed. However, none of these methods are satisfactory, and presently one compromises using an unsatisfactory method.

For example, the specification of U.S. Pat. No. 2,090,233 describes a method in which crude 2-mercaptobenzothiazole is washed with an excess amount of carbon disulfide with the carbon disulfide containing the byproducts and tars being reused in next reaction. With this method, however, it is difficult to separate reusable byproducts and intermediates from the resinous tars, and the desired product may be deteriorated for reuse of carbon disulfide used for washing. Therefore, in order to hold the quality constant, it is necessary to increase extremely the amount of carbon disulfide to be used for washing. Alternatively, such a method in which the materials removed by washing are not reused is described in Canadian Pat. No. 448,209. However, this method cannot be carried out industrially from the standpoint of yield and cost.

The specification of U.S. Pat. No. 2,117,120 describes a method which comprises melting crude 2-mercaptobenzothiazole, and pouring the resulting melt into a dilute mineral acid (for example an 1 percent aqueous solution of sulfuric acid). Although unreacted aniline can be removed by this method, other byproducts, intermediates and tar contents, and the like, cannot be removed. Therefore, no practical value results.

Also, the *Bulletin of Industrial Chemistry*, 41, 371 describes processes such as dissolving crude 2-mercaptobenzothiazole in an aqueous 2 N caustic soda solution, introducing air into the solution for 20 hours to oxidize the intermediates and byproducts having a mercapto group, adding activated carbon thereto to adsorb the tarry contents, filtering them, and adding an aqueous 6N sulfuric acid solution to the filtrate to precipitate the 2-mercaptobenzothiazole which is then removed. However, it is not sufficient to obtain pure 2-mercaptobenzothiazole. As is clear from the description that it is necessary further to repeat the dissolution in caustic solution and precipitation with an acid. This method cannot be carried out without great expense because of the complicated procedure and the difficulty in reusing the byproducts and intermediates. In addition, when the pH is lowered sufficiently in the acid-preparation, since the purity of 2-mercaptobenzothiazole is decreased by precipitation of other impurities dissolved in the aqueous solution of the sodium salt of 2-mercaptobenzothiazole, the pH is not allowed to be below 5 to 4. Therefore it is difficult to precipitate the 2-mercaptobenzothiazole completely and inevitably the desired product is lost by dissolution. Therefore, it is difficult to find this method of value industrially even though it is practical in the laboratory.

A method is described in the specification of U.S. Pat. No. 2,161,741 which involves dissolving crude 2-mercaptobenzothiazole in aqueous ammonia, separating the insoluble materials by decantation, and collecting the 2-mercaptobenzothiazole precipitated by evaporating the ammonia. This method does not result in the perfect separation of unreacted aniline, benzothiazole, and tarry content and also requires an extremely large scale of apparatus because of the low solubility of 2-mercaptobenzothiazole in aqueous ammonia. Therefore, this method does not have practical value industrially.

U.S. Pat. 2,349,598, Czechoslovakian Pat. No. 102,400, PB Report Nos. 73911 and 73914, etc. describe methods for purifying 2-mercaptobenzothiazole involving pouring crude 2-mercaptobenzothiazole into a lime slurry, heating it at 40° to 80°C, filtering out the insolubles, and neutralizing the resulting calcium salt of 2-mercaptobenzothiazole with 10 percent hydrochloric acid and acid-precipitating it. However, the concentration treated is so low (approximately 2 percent solution) that these methods cannot be carried out effectively and, in addition, these methods are incomplete in separation and recovery of unreacted raw materials, intermediates, byproducts and tarry contents. For example, byproducts and intermediates having a mercapto group contained in the crude 2-mercaptobenzothiazole are not recovered and separated but are incorporated into the product. These methods are not favorable from the standpoint of purity. Further, the specification of U.S. Pat. No. 2,631,153 describes an insolubilizing-separation method for soluble impurities which comprises introducing air into a dilute caustic alkaline solution of crude 2-mercaptobenzothiazole at pH of 8 to 9 at a temperature of 20° to 70°C for 24 hours. This method is similar to that described in *Bulletin of Industrial Chemistry*, 41, 371 and is not practical for the same reasons as mentioned above. However, even if the soluble impurities are insolubilized in a caustic alkali solution by air oxidation, the impurities exhibit considerable solubility in the system in which an organic material such as 2-mercaptobenzothiazol is also soluble.

The specifications of U.S. Pat. Nos. 2,658,864 and 2,730,528 and Japanese Pat. publication No. 4886/1955 describe an insolubilizing-separation method which comprises treating a molten crude 2-mercaptobenzothiazole with super heated steam at 170° to 240°C to remove the unreacted aniline and the benzothiazole byproduct, dissolving it in about twice the amount of caustic soda solution and adding a peracid salt such as ammonium persulfate thereto for oxidation. These methods differ little from the above-mentioned method only in oxidation by peracid salt, and, therefore, are not satisfactory. Furthermore, as described on page 2, left column, lines 17 to 19 of the Japanese Pat. publication No. 4886/55, "in the actual operation of this method many conditions are required and considerable attention should be paid." Also from such a standpoint these methods are considered to be difficult to obtain a product having a constant high quality and are not recognized to be practical. The specification of Polish Pat. No. 43,721 describes a method such as dissolving the crude 2-mercaptobenzothiazole in a lime solution at 70° to 90°C, subjecting the solution to oxidation with calcium hypochlorite and treating it with activated carbon. However, according to the description on page 2, right column, lines 28 to 30 of the Japanese Pat. publication No. 4886/55, use of the hypochlorite gives rise to redissolution of the precipitated impurities, and, therefore, an improvement purity can not be expected with this method.

Further, the specification of U.S. Pat. No. 3,030,373 describes a method involving emulsifying crude 2-mercaptobenzothiazole with a solvent mixture of carbon disulfide and water in the presence of a nonionic surface active agent, and, after extraction and subsequent filtration, washing the cake with carbon disulfide. However, as is clearly described in the specification of Japanese Pat. publication No. 4886/55, the reduction in yield by this purification method is 3 to 4 percent, and, in addition, the purity is only 97 percent. Therefore, this method is not recognized to be valuable practical method.

A method described in *Khim.i.Ind.*, 29, 24 to 25, describes processes such as pouring molten crude 2-mercaptobenzothiazole into a 2 percent aqueous solution of caustic soda, filtering insolubles such as unreacted sulfur, acid-precipitating the filtrate with 10 percent sulfuric acid, and filtering the product precipitated at pH 4. This method seems to be considerably preferable in preventing incorporation of impurities because of the use of an extremely dilute solution such as a 2 percent solution of caustic soda. However, in practice on an industrial scale, a huge apparatus is required and the condition of acid precipitation is limited. In addition it is difficult to collect completely the products, and therefore the lowering of yield is inevitable.

As described above many methods for purifying crude 2-mercaptobenzothiazole are known, however, these methods include disadvantages and are not satisfactory.

The present inventors, as the result of various discussions, have succeeded in obtaining 2-mercaptobenzothiazole having high purity using a simple procedure, and, at the same time, in separate reusable materials, such as unreacted raw materials, byproducts, and intermediates, from materials such as resinous tar which cannot be reused.

SUMMARY OF THE INVENTION

The present invention provides a process for purifying crude 2-mercaptobenzothiazole obtained by the reaction of aniline, sulfur and carbon disulfide, which comprises vaporizing crude 2-mercaptobenzothiazole to remove the non-volatile impurities, condensing the vaporized matter, dissolving the condensate in an aqueous alkali solution to remove the insolubles and subjecting the alkali solution to extraction with an aromatic hydrocarbon to remove the impurities.

DETAILED DESCRIPTION OF THE INVENTION

The present invention comprises three steps. The first step comprises vaporizing crude 2-mercaptobenzothiazole to remove the non-volatile resinous materials and to separate hydrogen sulfide, carbon disulfide, aniline, benzothiazole, 2-aminothiophenol, phenylisothiocyanate, diphenylthiourea, and the like have a higher vapor pressure than 2-mercaptobenzothiazole and are easy to volatilize. The separated and recovered materials with the exception of hydrogen sulfide can be reused in subsequent reaction.

The second step comprises dissolving the fractions containing the 2-mercaptobenzothiazole, sulfur, anilinobenzothiazole, and β-(2-benzothiazolyl)-2-benzothiazolinethione, which are similar in vapor pressure, in an aqueous alkali solution to separate the insolubles. The insolubles separated can be reused in a subsequent reaction. On the other hand a light yellow brown transparent liquid obtained by separating the insolubles contains still 1 to 2 percent impurities. The impurities result in a violet brown/or black brown coloration of the products derived from 2-mercaptobenzothiazole, so that the products may be spoiled in appearance and be also affected adversely in quality and performance. Therefore, such impurities should be removed from the light yellow brown transparent liquid. For this purpose activated carbon treatment has hitherto been carried out, but such a treatment is not recognized to be effective for removing such impurities which are not tarry material. In investigating the extraction of such impurities with a substantially water-insoluble organic solvent such as carbon disulfide, carbon tetrachloride, chloroform, ether, and the like, however, in many cases, no effect has been recognized and, particularly, in case of using carbon disulfide, a large amount of 2-mercaptobenzothiazole is lost by dissolution. It was surprising to find that 100 percent of such impurities can be extracted and removed using an aromatic hydrocarbon. Thus, the third step of the present invention comprises subjecting the light yellow brown transparent liquid to extraction with an aromatic hydrocarbon.

In carrying out the first step of the present invention, conventional single distillation can be carried out. However, it is not preferred because heating and retaining of 2-mercaptobenzothiazole for long periods of time in distillation results in thermal decomposition of 2-mercaptobenzothiazole. Therefore, it is preferable to feed continuously and distill 2-mercaptobenzothiazole using a high vacuum and high temperature system. In this case, the reduced pressure used ranges from 0.5 to 5.0 mm Hg, preferably below 2 mm Hg, and the temperature in the carburetor is in the range of from 190° to 250°C, preferably from 200° to 220°C.

In carrying out the second step of the present invention, the concentration of 2-mercaptobenzothiazole in the alkali solution ranges from 5 to 50 percent by weight, preferably from 20 to 40 percent by weight, based on the weight of the alkali solution. The alkali used in the present process includes alkali metal and alkaline earth metal hydroxides. From the industrial point of view, sodium hydroxide is preferred.

The alkali can be used in an amount required for dissolving the 2-mercaptobenzothiazole, more specifically, the alkali can be used in an amount ranging from 2.1 to 21.0 percent by weight based on the weight of the solution.

It is to be noted that the higher concentration has a tendency to increase solubility of sulfur and anilinobenzothiazole. The solubilization temperature has a large effect upon the solubility of the byproducts and intermediates, and therefore it is carried out at from 10° to 50°C, preferably from 25° to 35°C.

In carrying out the third step of the present invention, the aromatic hydrocarbon herein used is preferably material which is liquid at room temperature, such as benzene, toluene, xylene, ethylbenzene, isopropylbenzene, mesitylene, and the like. The amount of aromatic hydrocarbon to be used ranges from 5 to 50 percent, preferably from 10 to 30 percent based on the volume of liquid to be extracted and the extraction can be carried out batchwise or in continuous concurrent manner. The extraction temperature ranges from 5° to 70°C, preferably from 25° to 35°C.

In order to purify crude 2-mercaptobenzothiazole, it may be sufficient to apply the first step of the present invention, but it is preferable to further apply the second and/or third steps of the present invention.

It is preferable to carry them out continuously.

The process of the present invention will be illustrated by reference to the following examples, which are, of course, not to be interpreted as limiting the scope of the present invention. Percents given are by weight.

EXAMPLE 1

500 g of crude 2-mercaptobenzothiazole, comprising 0.08 percent carbon disulfide, 0.09 percent aniline, 2.54 percent benzothiazole, 6.80 percent sulfur, 1.15 percent anilinobenzothiazole, 1.31 percent 3-(2-benzothiazolyl)-2-benzothiazolinethione, 84.53 percent 2-mercaptobenzothiazole, 2.30 percent unknown ingredients, and 1.20 percent resinous tar, was fed over 3 hours into a 200 ml flask heated at 220°C under a reduced pressure of 1 mm Hg while maintaining the molten state at 170°C. The evaporized content successively distilled out from a distillation outlet fitted on the upper part of the flask was introduced to a conduit tube of 30 cm in length, which was maintained at 180° to 190°C, and the liquified components were introduced into a first receiver (1). Unliquified components were introduced into a second receiver (2) through a cooler, cooled with an ice water, and a tube cooled with a dry ice-methanol mixture. The exhaust port was connected to a caustic soda filling tower. As the result, 478.75 g of material was collected in the receiver (1) and 14.7 g of material was collected in the receiver (2), and 6.20 g of nonvolatile resinous tar remained in the flask. 0.30 g of hydrogen sulfide was absorbed in the caustic soda filling tower.

The composition of the material collected in the receiver (1) consisted of 7.41 percent sulfur, 1.11 percent anilinobenzothiazole, 1.82% of 3-(2-benzothiazolyl)-2-benzothiazolinethione, 87.25 percent 2-mercaptobenzothiazole and 2.41 percent unknown components.

The composition of the materials collected in receiver (2) consisted of 2.71 percent carbon disulfide, 5.76 percent aniline, and 91.52 percent benzothiazole.

The contents of the receiver (1) was in the molten state at about 190°C. The contents were poured into a cold solution containing 1.05 mole times caustic soda (based on 2-mercaptobenzothiazole) under stirring. The liquid temperature was controlled at 25° to 30°C. After retention for 20 minutes the insolubles were filtered. The 2-mercaptobenzothiazole content in the filtrate was 40 percent.

The insolubles were a mixture consisting of 35.50 g of sulfur, 5.32 g of anilinobenzothiazole and 8.72 g of 3-(2-benzothiazolyl)-2-benzothiazolinethione, and was found to have been recovered almost quantitatively from the contents of the receiver (1). On other hand, the filtrate of the light yellow brown contained 417.71 g of 2-mercaptobenzothiazole and 11.50 g of unknown components. 200 ml of xylene was added to 1,044.3 g of this solution, and the mixture was, after shaking for 10 minutes, allowed to stand to separate the xylene layer. This operation was repeated five times. The xylene layers were mixed and distilled to recover the xylene. In the flask 11.49 g of a dark brown solid remained. On the other hand, the aqueous layer was light yellow and transparent, and unknown components were scarcely recognized. Thus, 1,032.8 g of aqueous light yellow white solution of the sodium salt of 2-mercaptobenzothiazole having extremely high purity were obtained.

EXAMPLE 2

As in Example 1, the extraction was carried out using toluene, isopropyl benzene, and mesitylene, instead of xylene, and the residues after recovering by single distillation of the extracting solvent were 11.47 g, 11.28 g and 11.31 g, respectively.

EXAMPLE 3

100 g of the light yellow brown solution obtained as in Example 1 were weighed in 300 ml beaker and 20 percent sulfuric acid was added dropwise thereto while stirring. When pH of the solution reached below 2, the addition of sulfuric acid was stopped, and the light yellow-white powder precipitated thereby was filtered, washed with water until the washing became neutral, and thereafter, was dried to a constant weight. There was obtained 40.44 g of light yellow-white 2-mercaptobenzothiazole, m.p. 181.5° to 182.5°C, purity 99.95 percent in a yield of 100 percent (theoretical value).

REFERENCE EXAMPLE 97.5 g of the light yellow-white solution obtained as in Example 1 was diluted with 292.5 g of water and a gaseous mixture of chlorine and air in volume ratio of 1:30, while controlling the pH to 10 to 11, was introduced thereinto at 50° to 55°C with stirring. The reaction was completed with 930 ml of the introduced gaseous mixture and pure white crystal precipitate was filtered, washed with water and dried, 38.0 g (98.0 percent theoretical value) of dibenzothiazyl-disulfide was obtained. Melting point 179.5° to 181.0°C.

What is claimed is:

1. A process for purifying crude 2-mercaptobenzothiazole obtained by the reaction of aniline, sulfur and carbon disulfide, which comprises vaporizing the crude 2-mercaptobenzothiazole to remove the non-volatile impurities, condensing the vapor, dissolving the condensate in an aqueous alkali solution to remove the insolubles, extracting the resulting alkali solution with an aromatic hydrocarbon, separating said aromatic hydrocarbon from said alkali solution, and separating said aromatic hydrocarbon and said 2-mercaptobenzothiazole to recover said 2-mercaptobenzothiazole.

2. The process according to claim 1, wherein the vaporization is carried out under a reduced pressure of from 0.5 to 5.0 mmHG and at a temperature of from 190° to 250°C.

3. The process according to claim 1, wherein the alkali used in the amount required to dissolve the 2-mercaptobenzothiazole and the aqueous alkali solution is used in an amount necessary to result in a concentration of 2-mercaptobenzothiazole in the solution of from 5 to 50 percent by weight.

4. The process according to claim 1, wherein the aromatic hydrocarbon is selected from the group consisting of benzene, toluene, xylene, ethylbenzene, isopropylbenzene and mesitylene.

5. The process according to claim 1, wherein the process is operated continuously by feeding crude 2-mercaptobenzothiazole and removing pure 2-mercaptobenzothiazole.

6. A process for purifying crude 2-mercaptobenzothiazole obtained by the reaction of aniline, sulfur and carbon disulfide, which comprises the following steps: a. vaporizing said crude 2-mercaptobenzothiazole to remove the non-volatile impurities;
b. condensing the vapor to obtain a condensate;
c. admixing said condensate and an aromatic hydrocarbon to form a slurry;
d. filtering said slurry to recover solids;
e. dissolving said solids in an aqueous alkali solution to remove the insolubles;
f. separating said aromatic hydrocarbon from said alkali solution; and
g. separating said aromatic hydrocarbon and said 2-mercaptobenzothiazole to recover said 2-mercaptobenzothiazole.

7. The process according to claim 1, wherein the vaporization is carried out under a reduced pressure of from 0.5 to 5.0 mmHg and at a temperature of from 190° to 250°C.

8. The process according to claim 1, wherein the alkali used in the amount required to dissolve the 2-mercaptobenzothiazole and the aqueous alkali solution is used in an amount necessary to result in a concentration of 2-mercaptobenzothiazole in the solution of from 5 to 50 percent by weight.

9. The process according to claim 1, wherein the aromatic hydrocarbon is selected from the group consisting of benzene, toluene, xylene, ethylbenzene, isopropylbenzene and mesitylene, 10. The process according to claim 1, wherein the process is operated continuously by feeding crude 2-mercaptobenzothiazole and removing pure 2-mercaptobenzothiazole.

11. The process according to claim 1 wherein said vaporizing removes non-volatile impurities and separates members of the group consisting of hydrogen sulfide, carbon disulfide, aniline, benzonthiazole, 2-aminothiophenol, phenyldiisothiocyanate, and diphenylthiourea from said crude 2-mercaptobenzothiazole.

12. The process according to claim 11 wherein said members have a vapor pressure higher than said 2-mercaptobenzothiazole.

13. The process according to claim 1 wherein said alkali in said aqueous alkali solution is a hydroxide selected from the group consisting of alkali metals and alkaline earth metals.

14. The process according to claim 13 wherein said alkali metal is sodium.

15. The process according to claim 1 wherein said alkali is used in an amount in the range of 2.1 to 21.0 percent by weight based on the weight of said condensate.

16. The process according to claim 1 wherein said condensate and said aqueous alkali solution are solubilized at a temperature in the range of 10° to 50° C.

17. The process according to claim 1 wherein said aromatic hydrocarbon is used in an amount in the range of 5 to 50 percent based on the volume of the liquid to be extracted.

18. The process according to claim 1 wherein said process is operated batchwise.

19. The process according to claim 1 wherein said extracting takes place at a temperature in the range of from 5° to 70° C.

20. The process according to claim 6 wherein said vaporizing removes non-volatile impurities and separates members of the group consisting of hydrogen sulfide, carbon disulfide, aniline, benzothiazole, 2-aminothiophenol, phenyldiisothiocyanate, and diphenylthiourea from said crude 2-mercaptobenzothiazole.

21. The process according to claim 20 wherein said members have a vapor pressure higher than said 2-mercaptobenzothiazole.

22. The process according to claim 6 wherein said alkali in said aqueous alkali solution is a hydroxide selected from the group consisting of alkali metals and alkaline earth metals.

23. The process according to claim 22 wherein said alkali metal is sodium.

24. The process according to claim 6 wherein said alkali is used in an amount in the range of 2.1 to 21.0 percent by weight based on the weight of said condensate.

25. The process according to claim 6 wherein said condensate and said aqueous alkali solution are solubilized at a temperature in the range of 10° to 50° C.

26. The process according to claim 6 wherein said aromatic hydrocarbon is used in an amount in the range of 5 to 50 percent based on the volume of the liquid to be extracted.

27. The process according to claim 6 wherein said process is operated batchwise.

28. The process according to claim 6 wherein said extracting takes place at a temperature in the range of from 5° to 70° C.

* * * * *